(12) United States Patent
Yamauchi

(10) Patent No.: US 6,266,448 B1
(45) Date of Patent: Jul. 24, 2001

(54) METHOD OF AND APPARATUS FOR COMPRESSING AND ENCODING DIGITIZED MOVING PICTURE SIGNALS

(75) Inventor: Tatsuo Yamauchi, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/213,423

(22) Filed: Dec. 17, 1998

(30) Foreign Application Priority Data

Dec. 24, 1997 (JP) .................................................. 9-354442

(51) Int. Cl.$^7$ ...................................................... G06K 9/36
(52) U.S. Cl. ............................................................ 382/236
(58) Field of Search .................................... 382/232, 236, 382/238, 240, 242, 248, 250; 348/384, 394, 395, 400–404, 407–416, 420, 421, 425, 430, 431, 699

(56) References Cited

U.S. PATENT DOCUMENTS

| | | | |
|---|---|---|---|
| Re. 36,822 | * 8/2000 | Sugiyama | 382/236 |
| 5,146,325 | * 9/1992 | Ng | 382/236 |
| 5,267,334 | * 11/1993 | Normille et al. | 382/236 |
| 5,878,169 | * 3/1999 | Miyamoto | 382/236 |
| 5,881,174 | * 3/1999 | Kim | 382/236 |
| 5,911,008 | * 6/1999 | Niikura et al. | 382/236 |
| 5,933,534 | * 8/1999 | Yoshimoto et al. | 382/236 |
| 5,987,180 | * 11/1999 | Reitmeier | 382/236 |
| 6,002,802 | * 12/1999 | Chujoh et al. | 382/236 |
| 6,108,449 | * 8/2000 | Sekiguchi et al. | 382/236 |

OTHER PUBLICATIONS

"Data Compressing and Digital Modulation, 1995". Nikkei Electronics Books, Nikkei Business Publications, Inc., p. 58, Fig. 11.

* cited by examiner

Primary Examiner—Jose L. Couso
(74) Attorney, Agent, or Firm—Rabin & Champagne, P.C.

(57) ABSTRACT

A frame memory supplies picture signals from an input terminal to a motion vector detecting circuit after delaying them by one frame period. The motion vector detecting circuit detects a motion vector based on picture signals of the present frame from the input terminal and the delayed picture signals of the previous frame which are supplied from the frame memory. A motion compensation circuit corrects picture signals inputted thereto using the detected motion vector. An inter-frame coding circuit obtains inter-frame coded signals from the picture signals of the present frame, which were subjected to the motion compensation, and those of the previous frame decoded by a decoding circuit. The coded signals are outputted from an output terminal as a coded bit stream via a mixer along with the coded motion vector.

11 Claims, 3 Drawing Sheets

METHOD OF AND APPARATUS FOR COMPRESSING AND ENCODING DIGITIZED MOVING PICTURE SIGNALS

BACKGROUND OF THE INVENTION

1. Field of the Invention

The present invention relates to a method of and apparatus for compressing and encoding digitized moving picture signals and, more particularly to a moving picture coding apparatus that is suitably used for transmitting and storing digitized moving picture signals such as television signal, and a method of coding the signals.

2. Description of the Background Art

As a prior art, a moving picture coding apparatus for compressing and encoding moving picture signals such as television signals, described in "Data Compression and Digital Modulation, 1995", Nikkei Electronics Books, published by Nikkei Business Publications, Inc., on page 58, FIG. 11. What is described is a moving picture coding apparatus using an inter-frame coding system for encoding the moving picture signal after removing any redundancy between frames.

Such a moving picture coding apparatus comprises, for example, an intra-frame coding circuit for performing an intra-frame coding of a moving picture signal; a memory for storing an encoded signal; a decoding circuit for performing an inverse transform of the encoded signal delayed by one frame period by the memory; a vector detecting circuit for referencing the moving picture signal of the precedent frame encoded by the coding circuit to detect a motion vector of a moving picture signal of the present frame inputted thereto; a motion compensation circuit for performing a motion compensation for the moving picture signal inputted thereto using the detected motion vector; an inter-frame coding circuit for coding a differential value between the moving picture signal of the present frame subjected to the motion compensation and the moving picture inverse-transformed by the decoding circuit; and a mixer for adding the encoded motion vector to an encoded signal subjected to the inter-frame coding.

In this moving picture coding apparatus, a moving picture signal inputted to its input terminal is sequentially supplied to the intra-frame coding circuit, the motion vector detecting circuit and the motion compensation circuit. The moving picture signal supplied to the intra-frame coding circuit is transformed into the coefficients of frequency components for each block composed of a predetermined number of pixels according to a transform scheme such as a discrete cosine transform (hereinafter referred to as a DCT) and encoded within a frame. The encoded moving picture signal is sequentially stored in the memory, and supplied to the coding circuit with a delay of one frame period. The encoded signal supplied to the coding circuit is subjected to, for example, an inverse DCT (IDCT) which is an operation opposite to that performed by the coding circuit. This signal is then supplied to the motion vector detecting circuit and to the inter-frame circuit as an original moving picture signal of a preceding frame.

The motion vector detecting circuit which has received the moving picture signal of the present and a preceding frame, calculates a motion vector expressing the magnitude and the direction of a motion of a moving portion from the two moving picture signals for each corresponding block comprising a predetermined number of pixels, and supplies the motion vector to the motion compensation circuit and to the mixer. In the motion compensation circuit, the moving picture signal inputted thereto undergoes a motion compensation for each block based on the motion vector, and the moving picture signal having been subjected to the motion compensation is supplied to the inter-frame coding circuit.

In the inter-frame coding circuit, a difference between the moving picture signal of the present frame having been subjected to the motion compensation and the moving picture signal of the previous frame supplied from the coding circuit is obtained, and the moving picture signal expressed in the form of this difference is in turn encoded for each block using the DCT, in a manner similar to that performed in the intra-frame coding circuit. The encoded signal having been subjected to the inter-frame coding is supplied to the mixer, and outputted in the form of a predetermined encoded bit stream along with the encoded motion vector.

According to the foregoing moving picture coding apparatus, by referencing the moving picture signal of the previous frame which is once encoded and then decoded, the motion vector between this moving picture signal and the moving picture signal of the present frame is detected, and the moving picture signal expressed in the form of the difference between the moving picture signal of the present frame, which has been subjected to the motion compensation, and the decoded moving picture signal of the previous frame is subjected to the inter-frame coding. Thus, the moving picture signal is compressed and encoded.

However, in the foregoing conventional technique, by referencing the moving picture signal of the previous frame which has been once encoded and then decoded, the motion vector of the present frame is obtained, and the motion compensation and the inter-frame coding are carried out, based on the motion vector. Therefore, when the moving picture signal of the previous frame has an operational error, the precision of a motion vector detection deteriorates, resulting in a reduction in coding efficiency.

For example, in the case where an irreversible coding is used like the DCT at the time of the intra-frame coding, the moving picture signals obtained by decoding are not restored to the original ones. For this reason, even when there is no motion in the image, such an operational error may erroneously be detected as motion, so that the moving picture signals are subjected to motion compensation by means of their motion vectors, resulting in a failure of the moving picture signals to be subjected to an accurate positional correction. Therefore, an inter-frame coding using the signals that have been subjected to the positional correction may result in a deteriorated coding efficiency.

Moreover, since an inter-frame difference value between moving picture signals before being coded and moving picture signals after being decoded does not become zero, coded signals occur even in a static image area such as the background of the picture, so that a deterioration in image quality is caused.

SUMMARY OF THE INVENTION

It is therefore an object of the present invention to provide a moving picture coding apparatus that is capable of appropriately detecting a motion vector and a portion having no motion thereby obtaining an encoded signal with less image quality deterioration with a high coding efficiency, and a method of coding the signals.

In accordance with the present invention, a moving picture coding apparatus for compressing and encoding digitized moving picture signals, comprises, an intra-frame coding circuit for coding a frame of picture signals inputted thereto for each frame; a first storing circuit for storing at least one frame of coded signals obtained from the intra-frame coding circuit; a decoding circuit for decoding the coded signals supplied from the first storing circuit with a delay of at least one frame period; a second storing circuit for storing at least one frame of the picture signals inputted thereto; a motion vector detecting circuit for detecting a motion vector that expresses a magnitude and a direction of an image from the picture signals inputted thereto and the picture signals obtained from the second storing circuit, which are delayed by at least one frame period; a motion compensation circuit for compensating for a motion of the picture signals inputted thereto, based on the motion vector from the motion vector detecting circuit; and an inter-frame coding circuit for performing inter-frame coding of a difference value between the picture signals obtained from the decoding circuit and the picture signals in which the motion is compensated for by the motion compensation circuit.

Also, in accordance with the present invention, a moving picture coding apparatus for compressing and encoding digitized picture signals comprises, an intra-frame coding circuit for coding a frame of picture signals inputted thereto for each frame; a first storing circuit for storing at least one frame of coded signals obtained from the intra-frame coding circuit; a decoding circuit for decoding the coded signals supplied from the first storing circuit with a delay of one frame period; an inter-frame difference calculating circuit for obtaining an inter-frame difference value between picture signals obtained from the decoding circuit and the picture signals inputted thereto; a second storing circuit for storing at least one frame of picture signals inputted thereto; a static image region detecting circuit for detecting a static image region from the picture signals inputted thereto and the picture signals obtained from the second storing circuit with a delay of at least one frame period; a differential value selecting circuit for changing the value obtained from the inter-frame difference calculating circuit for the static image region to zero when the static image region detecting circuit detects a static image region; and a difference value coding circuit for encoding an inter-frame difference signal supplied from the inter-frame difference calculating circuit via the difference value selecting circuit.

Further, in accordance with the present invention, a method of inter-frame coding digitized moving picture signals by a motion compensation and inter-frame coding comprises the steps of, when a motion compensation inter-frame coding is performed: detecting a motion vector of the picture signals inputted thereto by referencing picture signals obtained by delaying picture signals precedent to the picture signals inputted thereto by at least one frame or one field period, performing a motion compensation for the picture signals inputted thereto using the detected motion vectors, and performing an inter-frame coding between the picture signals which were subjected to the motion compensation and picture signals obtained by decoding signals which were encoded before one frame or one field period.

Further, in accordance with the present invention, a method of inter-frame coding first moving picture signals digitized and received, comprises the steps of, encoding the first moving picture signals to produce second moving picture signals on a one-frame or field period basis, decoding the second moving picture signals to produce third moving picture signals, delaying the first moving picture signals by one frame or field period to produce fourth moving picture signals, detecting a static image region of the first moving picture signals with respect to the fourth moving picture signals, determining a difference between the first and the second moving picture signals to produce an inter-frame difference value representative of the difference, replacing with a zero part of the inter-frame difference value corresponding to the static image region, when detected, and encoding the inter-frame difference value partly replaced with the zero.

According to the present invention, the motion vectors are obtained by referencing the moving picture signals of the previous frame or field period, which are obtained by delaying the picture signals inputted thereto, and the inter-frame coding is performed on both of the picture signals of the present frame subjected to the motion compensation based on the motion vectors and the picture signals of the previous frame obtained by encoding and then decoding the picture signals inputted thereto, so that the motion compensation and inter-frame coding using the motion vectors with a high detection precision can be performed. Therefore, the coded signals which are subjected to the inter-frame coding by the accurate motion compensation can be obtained with a high coding efficiency.

Moreover, according to the present invention, a static image region, such as a background of a picture, is detected by referencing the moving picture signals of the previous frame or field, which are obtained by delaying the picture signals inputted thereto, and the static image portion of the inter-frame difference value between the picture signals of the present frame and the moving picture signals of the previous frame is forcibly made zero, the picture signals of the previous frame being obtained by encoding and then decoding the picture signals inputted thereto. Thereafter, the inter-block coding is performed. Therefore, it is possible to reduce block-shaped random noises and the like in the static image region using an irreversible decoding such as the DCT, which are generated in the inter-frame difference value between the picture signals of the present frame and the moving picture signals of the previous frame, resulting in achieving of a high quality image.

BRIEF DESCRIPTIONS OF THE DRAWINGS

The object and features of the present invention will become more apparent from consideration of the following detailed description taken in conjunction with the accompanying drawings in which.

DESCRIPTION OF THE PREFERRED EMBODIMENTS

Figure 1:
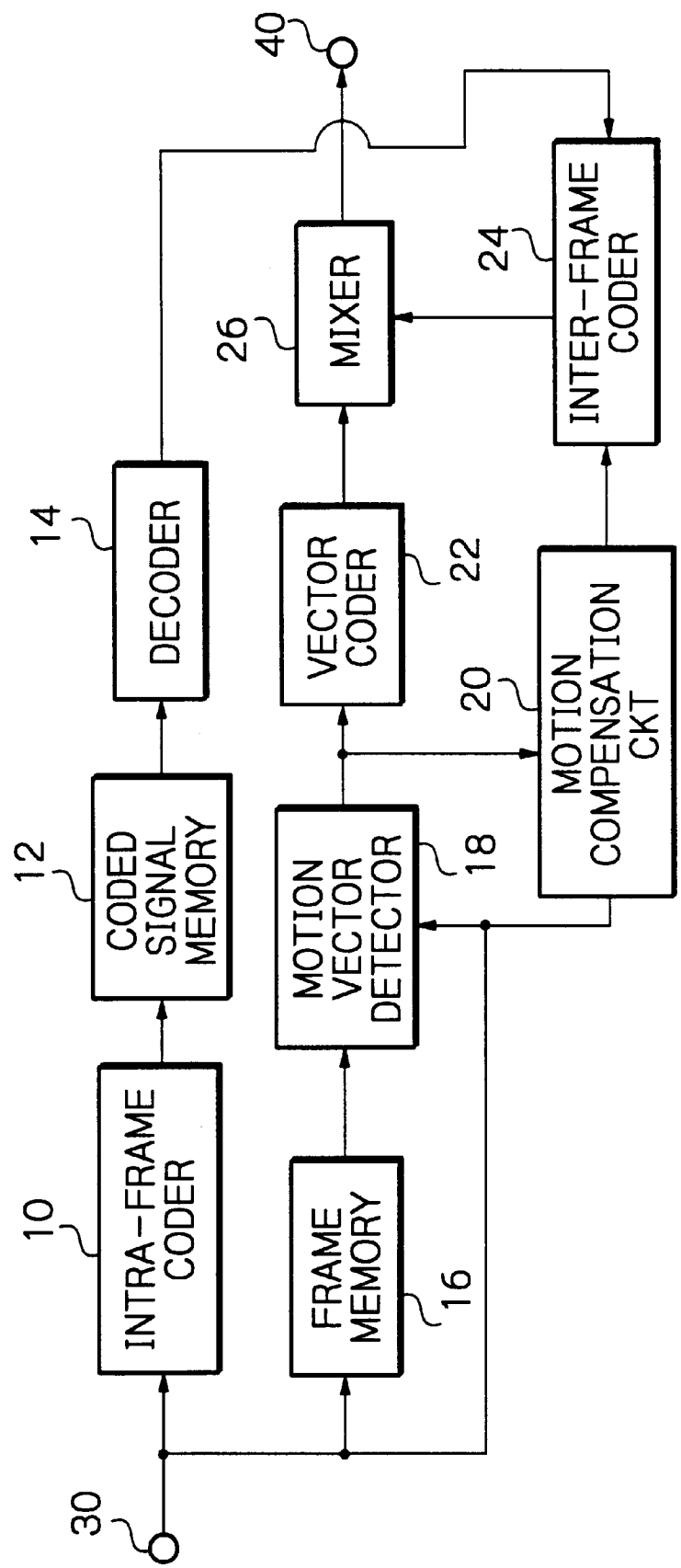
FIG. 1 is a schematic block diagram showing an embodiment of a moving picture coding apparatus of the present invention.

With reference to FIG. 1, an embodiment of a moving picture coding apparatus includes the signal compression feature of compressing and coding a moving picture signal obtained by digitizing a television signal from a television camera, for example. In this embodiment, the moving picture apparatus also includes the feature of the motion compensation inter-frame coding system for compressing and encoding an inter-frame difference value which has undergone a motion compensation based on a motion between frames.

Particularly, this embodiment has a feature in that when a motion vector expressing the magnitude and the direction of a motion between different frames of image are detected, moving picture signals directly inputted before one frame period are sequentially stored, a motion vector between the moving picture signal of the present frame and the moving picture signal of the previous frame is then detected, and a motion compensation inter-frame coding is performed based on the motion vector.

As shown in FIG. 1, the moving picture coding apparatus of this embodiment comprises an intra-frame coding circuit 10; a coded signal memory 12; a decoding circuit 14; a frame memory 16; a motion vector detecting circuit 18; a motion compensation circuit 20; a vector coding circuit 22; an inter-frame coding circuit 24; and a mixer 26. The intra-frame coding circuit 10 is adapted to sequentially receive digitized moving picture signals from an input terminal 30, and perform an intra-frame coding on the moving picture signals of each frame. For example, the coding circuit 10 preferably includes a discrete cosine transform (DCT) circuit, not shown, which encodes the moving picture signal into coefficients of frequency components for each block consisting a predetermined number of pixels by a DCT scheme. The encoded signals are sequentially stored in the coded signal memory 12.

The coded signal memory 12 is adapted for storing the encoded signals obtained from the intra-frame coding circuit 10 for one frame. The coded signal memory 12 also acts as a delay circuit which sequentially supplies the encoded signals delayed by one frame period to the decoding circuit 14 along with the moving picture signals of a next frame.

The decoding circuit 14 is adapted to sequentially decode the encoded signals of the previous frame obtained from the coded signal memory 12, which have been delayed by one frame period. The decoding circuit 14 advantageously includes an inverse DCT circuit, not shown, which performs an inverse DCT on the encoded signals, which is an operation almost opposite to that performed by the intra-frame coding circuit 10, thereby decoding the signals to the original moving picture signals. The decoded moving picture signals are sequentially supplied to the inter-frame coding circuit 24.

The frame memory 16 is adapted to store moving picture signals received on the input terminal 30 for one frame, which also functions as a delay circuit for sequentially supplying the moving picture signals delayed by one frame period to the motion vector detecting circuit 18.

The motion vector detecting circuit 18 serves as receiving moving picture signals of the present frame from the input terminal 30 and the moving picture signals of the previous frame from the frame memory 16 and detects a motion vector expressing the magnitude and direction of image motions based on these two moving picture signals. For example, the motion vector detection circuit 18 obtains the motion vectors for each block containing a predetermined number of pixels and supplies the obtained motion vectors to the motion compensation circuit 20, sequentially. In this embodiment, the iterative gradient method is advantageously used, which iteratively calculates the gradient of the present and previous frames for each corresponding block, thereby estimating the motion quantity. However, other detection methods which are capable of precisely obtaining the motion quantity, for example, a block matching method, may be applied. The detected motion vectors are sequentially supplied to the motion compensation circuit 20 and the vector coding circuit 22.

The motion compensation circuit 20 performs a motion compensation for the moving picture signals of the present frame inputted thereto by means of the motion vectors from the motion vector detecting circuit 18. The moving picture signals which underwent the motion compensation are supplied to the inter-frame coding circuit 24, sequentially. The vector coding circuit 22 encodes the motion vectors detected in the motion vector detecting circuit 18. For example, the vector coding circuit 22 sequentially encodes the difference between the motion vectors of adjacent blocks and supplies the difference to the mixer 26.

The inter-frame coding circuit 24 encodes the difference between the moving picture signals of the present frame and the moving picture signals of the previous frame supplied from the decoding circuit 14, the moving picture signals of the previous frame being supplied to the coding circuit 24 from the motion compensation circuit 20 after subjecting to motion compensation. The inter-frame coding circuit 24 includes a DCT circuit which performs the inter-frame coding for the difference between the moving picture signals of the previous and present frames using the DCT, in a manner similar to that performed by the intra-frame coding circuit 10. The encoded signals are sequentially supplied to the mixer 26.

The mixer 26 functions adding the encoded vector from the vector coding circuit 22 to the encoded signal from the inter-frame coding circuit 24 to synthesize them and outputs the synthesized encoded signal from an output terminal 40, sequentially.

In operation, first, the digitized moving picture signals received by the input terminal 30 are supplied to the intra-frame coding circuit 10, the frame memory 16, the motion vector detecting circuit 18, and the motion compensation circuit 20. The moving picture signals supplied to the intra-frame coding circuit 10 a re encoded into coefficients of frequency components for each block by means of the DCT and the like, and stored in the coded signal memory 12, sequentially. Next, the encoded signals stored in the coded signal memory 12 are read out after one frame period, and supplied to the decoding circuit 14. Thus, the encoded signals of the previous frame are inversely converted to be restored to the original moving picture signals by the inverse DCT in the decoding circuit 14. The original moving picture signals are sequentially supplied to the inter-frame coding circuit 24.

On the other hand, the moving picture signals supplied to the frame memory 16 are sequentially supplied to the motion vector detecting circuit 18 with the delay of one frame period. Thus, the motion vector detecting circuit 18 detects the motion vectors based on the moving picture signals of the previous frame from the frame memory and the moving picture signals of the present frame from the input terminal 30, and supplies the detected motion vectors to the motion compensation circuit 20 and the vector coding circuit 22. The motion vectors supplied to the vector coding circuit 22 are encoded, and supplied to the mixer 26.

In the motion compensation circuit 20 which received the motion vectors from the motion vector detecting circuit 18, the moving picture signals from the input terminal 30 are subjected to the motion compensation using the motion vectors, sequentially, and supplies the signals after being subjected to the motion compensation to the inter-frame coding circuit 24.

As a result, the inter-frame coding circuit 24 obtains the difference between the moving picture signal s of the previous frame obtained from the decoding circuit 14 and the moving picture signals of the present frame which underwent the motion compensation, and performs the inter-frame coding on the respective difference values to supply them to the mixer 26.

Subsequently, the mixer 26 synthesizes the encoded signals obtained from the inter-frame coding circuit 24 and the encoded signals from the vector coding circuit 22, and outputs the synthesized signals from the output terminal 40 in the form of encoded bit streams.

Similarly, the motion vector detecting circuit 18 detects the motion vectors based on the moving picture signals of the present frame inputted thereto and the moving picture signals of the previous frame delayed by the frame memory 16 by one frame, and supplies the detected motion vectors to the motion compensation circuit 20. The moving picture signals of the present frame which underwent the motion compensation by the motion compensation circuit 20 and the moving picture signals of the previous frame which were decoded by the decoding circuit 14 are subjected to the inter-frame coding by the inter-frame coding circuit 24. The encoded signals from the inter-frame coding circuit 24 and the encoded signals encoded by the vector coding circuit 22 are synthesized by the mixer 26, and sequentially outputted from the output terminal 40 in the form of compressed and encoded bit streams.

According to the moving picture coding apparatus of this embodiment, since the motion vectors of the present frame are detected by referencing the moving picture signals of the previous frame which are delayed by one frame period by the frame memory 16, the motion vectors can be detected more precisely compared to the case where the motion vectors are detected by referencing the moving picture signals of the previous frame which were once encoded and then decoded. Therefore, the motion compensation can be executed with high precision motion vectors, so that the coding efficiency of the inter-frame coding using the motion vectors can be enhanced.

Figure 3:
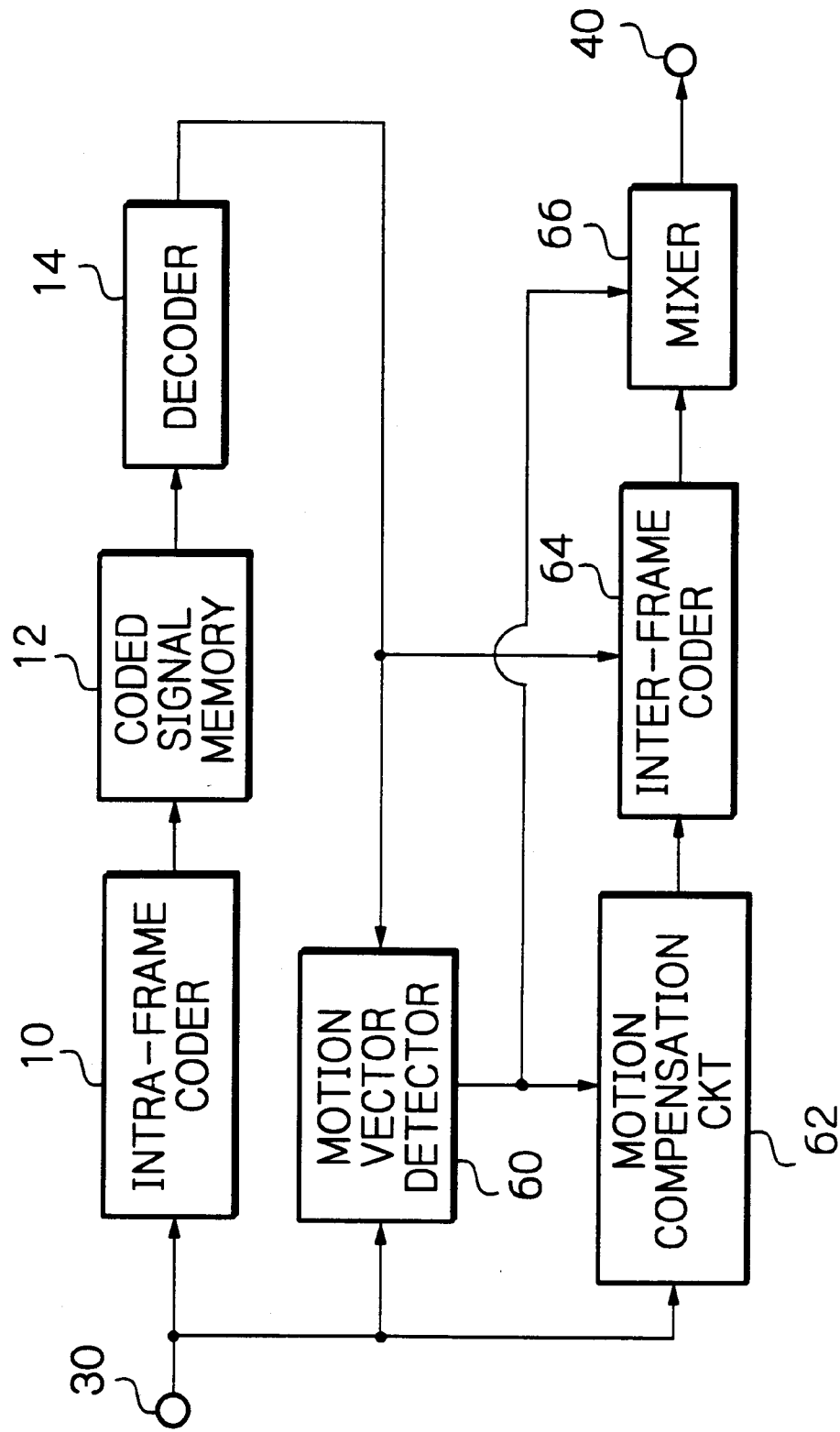
FIG. 3 shows, in a schematic block diagram form, an example of a conventional moving picture coding apparatus.

In order to facilitate understanding of the moving picture coding apparatus of this embodiment, the description is made by comparing with the conventional moving picture coding apparatus. In the conventional moving picture coding apparatus shown in FIG. 3, the moving picture signals of the previous frame decoded by the decoding circuit 14 are supplied to the motion vector detecting circuit 60. The motion vector detecting circuit 60 detects the motion vectors of the previous frame based on moving picture signals of the present frame inputted thereto and the moving picture signals of the previous frame which were once encoded and decoded. At this time, since the decoded moving picture signals of the previous frame were once encoded by the DCT, for example, they are not perfectly restored to the original ones by the inverse DCT, so that operational errors due to encoding and decoding may be included in the moving picture signals of the previous frame. Therefore, when the motion vectors are obtained by referencing the decoded moving picture signals of the previous frame, precision of the motion vectors is lowered, and hence operational errors are included in signals which are subjected to the motion compensation by means of the motion compensation circuit 62 using the obtained motion vectors. As a result, encoded signals which underwent the inter-frame coding by means of the inter-frame coding circuit 64 further include operational errors, resulting in degradation of the coding efficiency. In this embodiment, since the motion vectors are obtained by the motion vector detecting circuit 18 by referencing the moving picture signals of the previous frame delayed by the frame memory 16, which are directly supplied to the motion vector detecting circuit 18, a precision motion compensation can be performed by enhancing the detecting precision of the circuit 18, thus enhancing the coding efficiency.

Figure 2:
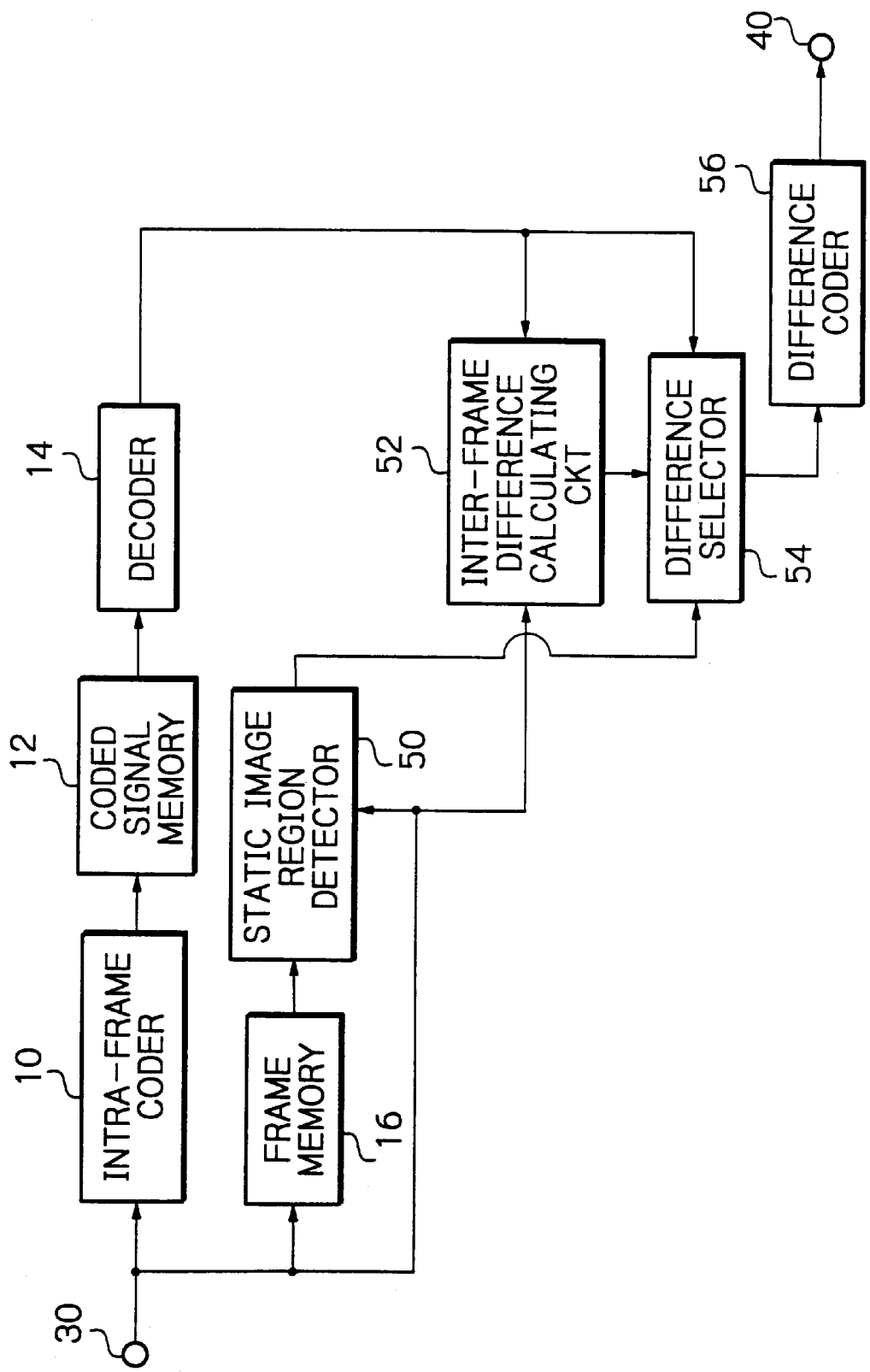
FIG. 2 is also a schematic block diagram, like FIG. 1, showing an alternative embodiment of a moving picture coding apparatus of the present invention.

FIG. 2 shows an alternative embodiment of the moving picture coding apparatus to which the coding method of the present invention is applied. The moving picture coding apparatus of this embodiment does not use a motion compensation, but directly obtains a difference value between the moving picture signals of the present and previous frames and encodes them. The moving picture coding apparatus of the latter embodiment has a principal feature in that a static image region is detected on the basis of the moving picture signals delayed by one frame period and the moving picture signals inputted to the static image region detecting circuit 50 to make the inter-frame difference value of the static image region forcibly zero. Note that in FIG. 2 the like elements as in the previous embodiment are represented by the same reference numerals and descriptions thereof are omitted.

More specifically, as shown in FIG. 2, the moving picture coding apparatus of this embodiment comprises the static image region detecting circuit 50; the inter-frame difference value calculating circuit 52; the difference value selector circuit 54; and the difference value coding circuit 56, in addition to the intra-frame coding circuit 10; the coded signal memory 12; the decoding circuit 14; and the frame memory 16.

The static image region detecting circuit 50 functions as detecting the static image region in an image from the moving picture signals of the present and previous frames, which are respectively supplied to the circuit 50 from the input terminal 30 and the frame memory 16 with the delay of one frame period. In this embodiment, the circuit 50, for example, includes a comparing circuit, not shown, which compares pixel values respectively corresponding to both of the moving picture signals of the present and previous frames. If the pixel values of them are the same as a result of the comparison, the comparison result is supplied to the difference value selector circuit 54.

The inter-frame difference value calculating circuit 52 is adapted to calculate the difference value of the pixel values corresponding to the moving picture signals of the present and previous frames which are supplied from the input terminal 30 and the decoding circuit 14, respectively. The result is supplied to the difference value coding circuit 56 via the difference value selector circuit 54.

The difference value selector circuit 54 serves to replace with a zero the inter-frame difference value of the static image region, when detected, based on the detection result from the static image region detecting circuit 50. The selector circuit 54 is responsive to the result from the inter-frame difference value calculating circuit 52 to supply the zero value with respect to the static image region or otherwise the inter-frame difference value to the difference value coding circuit 56.

The difference value coding circuit 56 encodes the inter-frame difference value supplied from the inter-frame difference value calculating circuit 52 via the difference value selecting circuit 54. The circuit 56 includes a DCT circuit which performs an inter-block coding for signals in the frames by means of the DCT conversion, in a manner similar to that performed by the intra-frame coding circuit 10. The encoded signals are outputted from the output terminal 40.

In operation, the moving picture signals from the input terminal 30 are supplied to the intra-frame coding circuit 10, the frame memory 16, the static image region detecting circuit 50, and the inter-frame difference value computing circuit 52. The moving picture signals supplied to the intra-frame coding circuit 10 are encoded, and are stored in the coded signal memory 12 for a period corresponding to one frame, similarly to the earlier-described embodiment. Thereafter, the encoded moving picture signals are decoded by the decoding circuit 14, and sequentially supplied to the inter-frame difference value calculating circuit 52.

Then, the inter-frame difference value calculating circuit 52 sequentially determines the difference value between the moving picture signals of the present and previous frames which are supplied from the input terminal 30 and the decoding circuit 14, respectively, and supplies the result to the difference value selector circuit 54.

On the other hand, the static image region detecting circuit 50 detects the static image region from both of the moving picture signals of the present and previous frames which are supplied from the input terminal 30 and the frame memory 16, respectively, and supplies the results to the difference value selector circuit 54, sequentially.

Next, in the difference value selector circuit 54 which received the results from the static image region detecting circuit 50 and the inter-frame difference value calculating circuit 52, the inter-frame difference value of the static image region thus detected is replaced with a zero and the replaced result is supplied to the difference value coding circuit 56 without changing the inter-frame difference values corresponding to the regions other than the static image region.

As a result, the difference value coding circuit 56 performs the inter-block coding on the inter-frame difference values obtained by replacing the static image region with a zero by means of the DCT, and the encoded signals are outputted from the output terminal 40.

The static image region is detected from the inputted moving picture signals of the present frame and the moving picture signals of the previous frame delayed by the frame memory 16, and the inter-frame difference values corresponding to the portions where the static image is detected are sequentially replaced with zeros. The inter-frame difference values are sequentially encoded and outputted from the output terminal 40 in the form of a predetermined encoded bit stream.

According to the moving picture coding apparatus of this embodiment, the static image region of the present frame is detected by referencing the moving picture signals of the previous frame which are supplied from the frame memory 16, and the inter-frame difference values are encoded after replacing the inter-frame difference values corresponding to the static image region with zeros. Therefore, block-shaped random noises are reduced, which are generated in the static image region of once encoded and the decoded moving picture signals by the DCT, resulting in an enhancement of an image quality.

In this alternative embodiment, by comparing the pixel values between the moving picture signals of the present and previous frames at the time of the detection of the static image region, the static image portion is detected. In the present invention, the motion vector may be detected for each block of a predetermined number of pixels and a portion where the motion vector is zero may be detected as the static image region. Moreover, similarly to the earlier-described embodiment, the moving picture signal coding apparatus may be designed such that the difference values of the moving picture signals which are subjected to the motion compensation using the motion vectors are encoded.

The descriptions of those embodiments were made to an application in which encoding for the moving picture signals between the frames are executed. The present invention covers an application where encoding for the moving picture signals between fields is adopted. Moreover, the invention may advantageously be applicable to the encoding which may be executed for the moving picture signals over several frames or fields as well as between two frames or fields.

Moreover, the illustrative embodiments include encoding of the moving picture signals performed only by means of the DCT. The present invention is also applied to an orthogonal transform such as the DCT, in which the moving picture signals are encoded by quantization and variable-length coding.

The entire disclosure of Japanese patent application No.354442/1997 filed on Dec. 24, 1997 including the specification, claims, accompanying drawings and abstract of the disclosure is incorporated herein by reference in its entirety.

While the present invention has been described with reference to the particular illustrative embodiments, it is not to be restricted by those embodiments. It is to be appreciated that those skilled in the art can change or modify the embodiments without departing from the scope and spirit of the present invention.

What is claimed is:

1. A moving picture coding apparatus for compressing and encoding digitized moving picture signals, comprising:

an input terminal for receiving picture signals for each frame or field of a moving picture;

an intra-frame coding circuit, coupled to the input terminal, for coding the received picture signals for each frame or field;

a first storing circuit, coupled to the intra-frame coding circuit for storing for at least one frame or field period at least one frame or field of the intra-frame-coded signals;

a decoding circuit, coupled to the first storing circuit, for receiving and decoding the intra-frame-coded signals with a delay of the at least one frame or field period;

a second storing circuit, coupled to the input terminal, for storing at least one frame or field of the received picture signals;

a motion vector detecting circuit, coupled to the input terminal and to the second storing circuit, for detecting a motion vector, which expresses a magnitude and a direction of motion of an image, from the received picture signals and the picture signals stored in said second storing circuit, which were received by the input terminal at least one frame or field period earlier;

a motion compensation circuit, coupled to the motion vector detecting circuit and the input terminal, for compensating in the received picture signals for the motion in the image, based on the motion vector from said motion vector detecting circuit; and an inter-frame coding circuit, coupled to the decoding circuit and the motion compensation circuit, for performing inter-frame coding of a difference between the decoding circuit decoded picture signals and the motion compensation circuit compensated picture signals, to obtain an inter-frame coded difference signal.

2. A coding apparatus according to claim 1, further comprising:

a vector coding circuit for encoding the motion vector detected by said motion vector detecting circuit; and a mixer, coupled to the vector coding circuit and the inter-frame coding circuit, for adding the encoded vector to the inter-frame coded difference signal, thereby to provide a synthesized signal.

3. A coding apparatus according to claim 1, wherein said intra-frame and inter-frame coding circuits encode an image as coefficients of frequency components using a discrete cosine transform.

4. A coding apparatus according to claim 1, wherein said motion vector detecting circuit is responsive to the picture signals stored by said second storing circuit and the picture signals received by said input terminal to repeatedly calculate an image gradient quantity by an iterative gradient method to obtain the motion vector.

5. A moving picture coding apparatus for compressing and encoding digitized moving picture signals, comprising:
- an input terminal for receiving picture signals for each frame or field of a moving picture;
- an intra-frame coding circuit, coupled to the input terminal, for coding one frame or field? of the received picture signals for each frame or field of the moving picture;
- a first storing circuit, coupled to the intra-frame coding circuit, for storing for one frame or field period at least one frame or field of the intra-frame coded signals;
- a decoding circuit, coupled to the first storing circuit for decoding the coded signals with a delay, following the coding, of the one frame or field period;
- an inter-frame difference calculating circuit, coupled to the decoding circuit and the input terminal, for obtaining an inter-frame difference between the decoding circuit decoded signals and the picture signals received by the input terminal;
- a second storing circuit, coupled to the input terminal, for storing, for at least one frame period, at least one frame or field of the picture signals received by the input terminal;
- a static image region detecting circuit, coupled to the input terminal, for detecting a static image region from the picture signals received by the input terminal and the picture signals delayed for the at least one frame period in the second storing circuit;
- a differential value selecting circuit, receiving the difference calculated by the inter-frame difference calculating circuit and responsive to detection of a static image region by the static image region detecting circuit, for changing the received difference for the detected static image region to zero; and
- a difference coding circuit for receiving and encoding an inter-frame difference signal supplied from said inter-frame difference calculating circuit via said difference value selecting circuit.

6. A coding apparatus according to claim 5, wherein said static image region detecting circuit includes a comparing circuit for comparing pixel values of the picture signals, and detecting the static image region based on a result of the comparison.

7. A coding apparatus according to claim 5, wherein said static image region detecting circuit includes a motion vector detecting circuit for detecting a motion vector from the picture signals, and detecting as the static image region a region of the image where a value of the motion vector detected by said motion vector detecting circuit is zero.

8. A coding apparatus according to claim 7, wherein said motion vector detecting circuit is responsive to the picture signals stored by said second storing circuit and the picture signals received by said input terminal to repeatedly calculate an image gradient quantity by an iterative gradient method to obtain the motion vector.

9. A coding apparatus according to claim 5 wherein said intra-frame coding circuit and said difference value coding circuit encode an image as coefficients of frequency components using, a discrete cosine transform.

10. A method of inter-frame coding digitized moving picture signals by motion compensation and inter-frame coding, comprising the steps of:
- receiving successive first frames of digitized first moving picture signals;
- directly delaying, by storing, the first frames or respective first fields of the first frames to produce, at least one frame period or filed period later, successive second frames or fields of second moving picture signals;
- detecting motion vectors of the first moving picture signals by referencing the second moving picture signals produced in the step of directly delaying by storing;
- performing motion compensation for the first moving picture signals, using the detected motion vectors, to produce third moving picture signals; and
- performing inter-frame coding based on the third moving picture signals and based on fourth moving picture signals resulting from encoding and decoding the first moving picture signals received at least one frame or one field period earlier.

11. A method of inter-frame coding digitized moving picture signals by motion compensation and inter-frame coding, comprising the steps of:
- receiving, digitized first moving picture signals;
- directly delaying, by storing, at least one frame or field of the first moving picture signals to produce second moving picture signals;
- encoding and decoding the first moving picture signals received at least one frame or field period earlier, so as to produce third moving picture signals;
- detecting a static image region of the first moving picture signals with respect to the second moving picture signals produced by storing the first moving picture signals received at least one frame or field period earlier;
- determining in connection with said step of detecting the static image region. differences between the first moving picture signals and the third moving picture signals so as to produce inter-frame difference values representative of the differences;
- replacing with a zero one of the produced inter-frame difference values, that corresponds to the static image region; and
- encoding the inter-frame difference values, following said step of replacing.

* * * * *